May 22, 1923.  1,456,026
T. C. LUCE
CHAIN WELDING MACHINE
Filed June 18, 1919   7 Sheets-Sheet 3
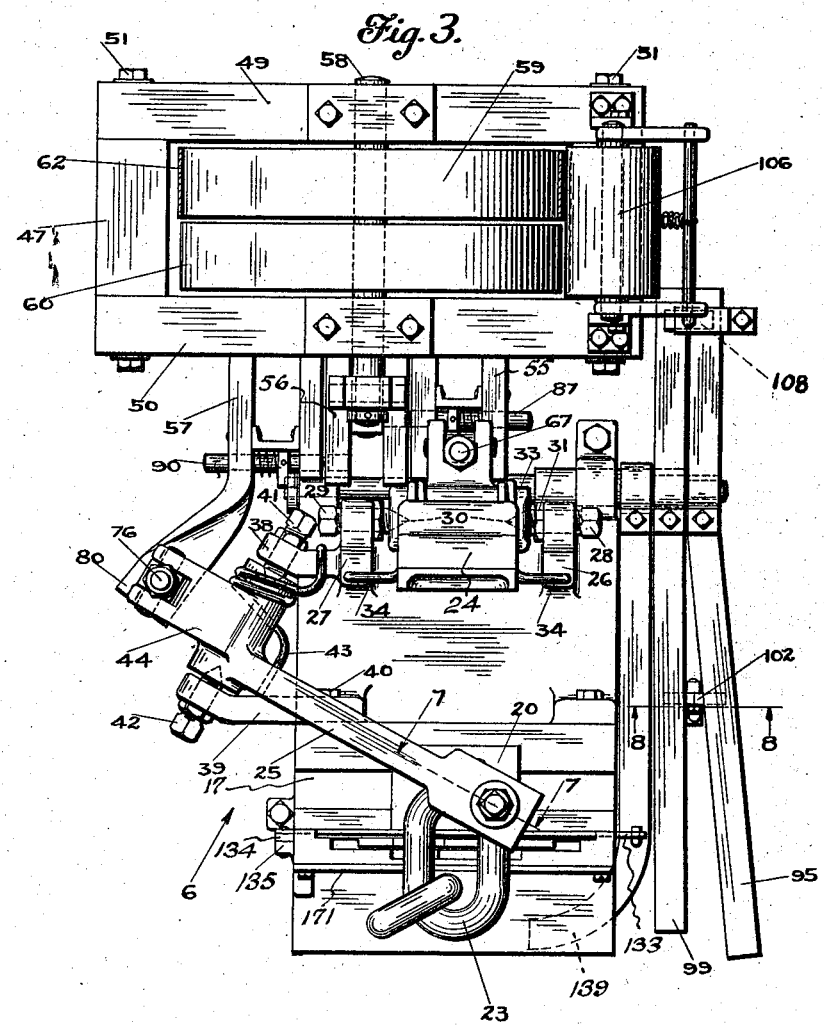
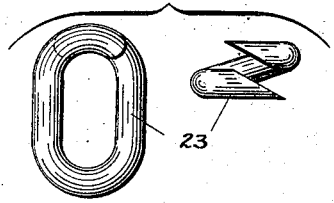
Inventor
Thomas C. Luce
By Henry E. Rockwell
Attorney May 22, 1923.
T. C. LUCE
1,456,026
CHAIN WELDING MACHINE
Filed June 18, 1919
7 Sheets-Sheet 5
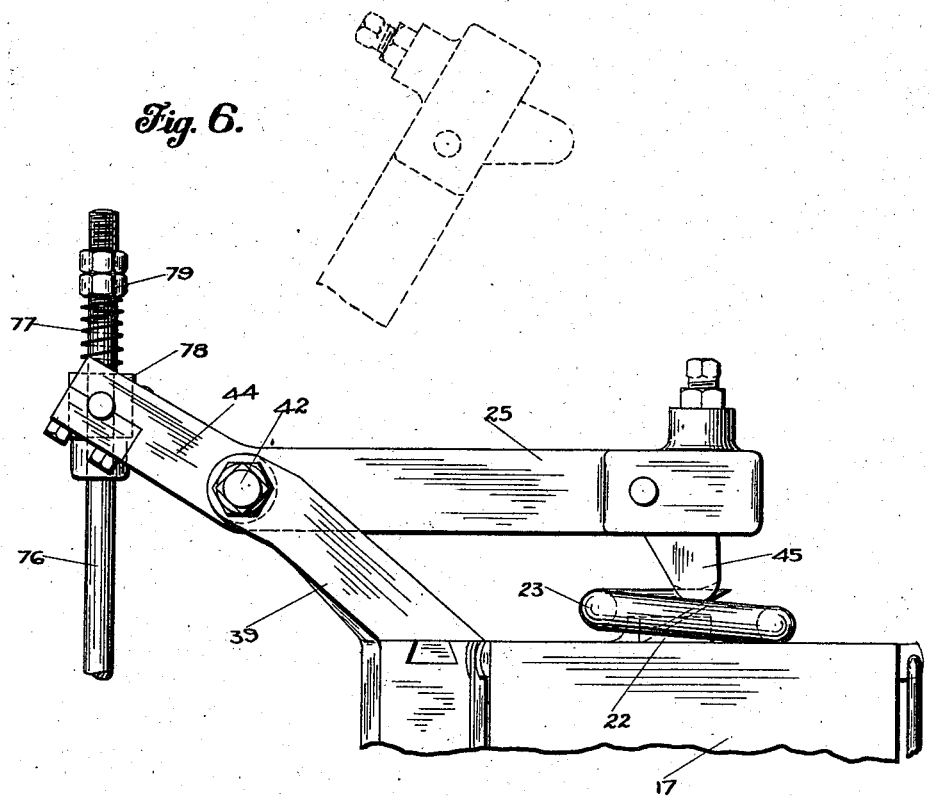
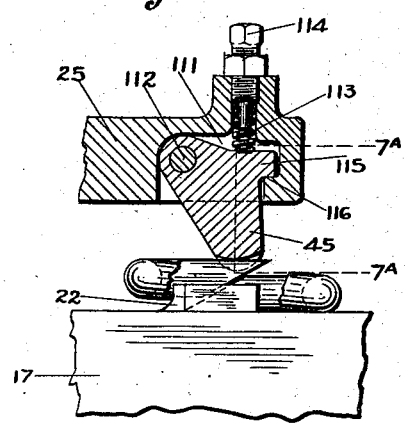
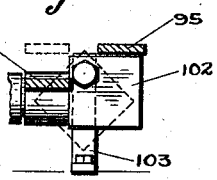
Inventor
Thomas C. Luce
By Henry E. Rockwell
Attorney May 22, 1923.  
T. C. LUCE  
CHAIN WELDING MACHINE  
Filed June 18, 1919

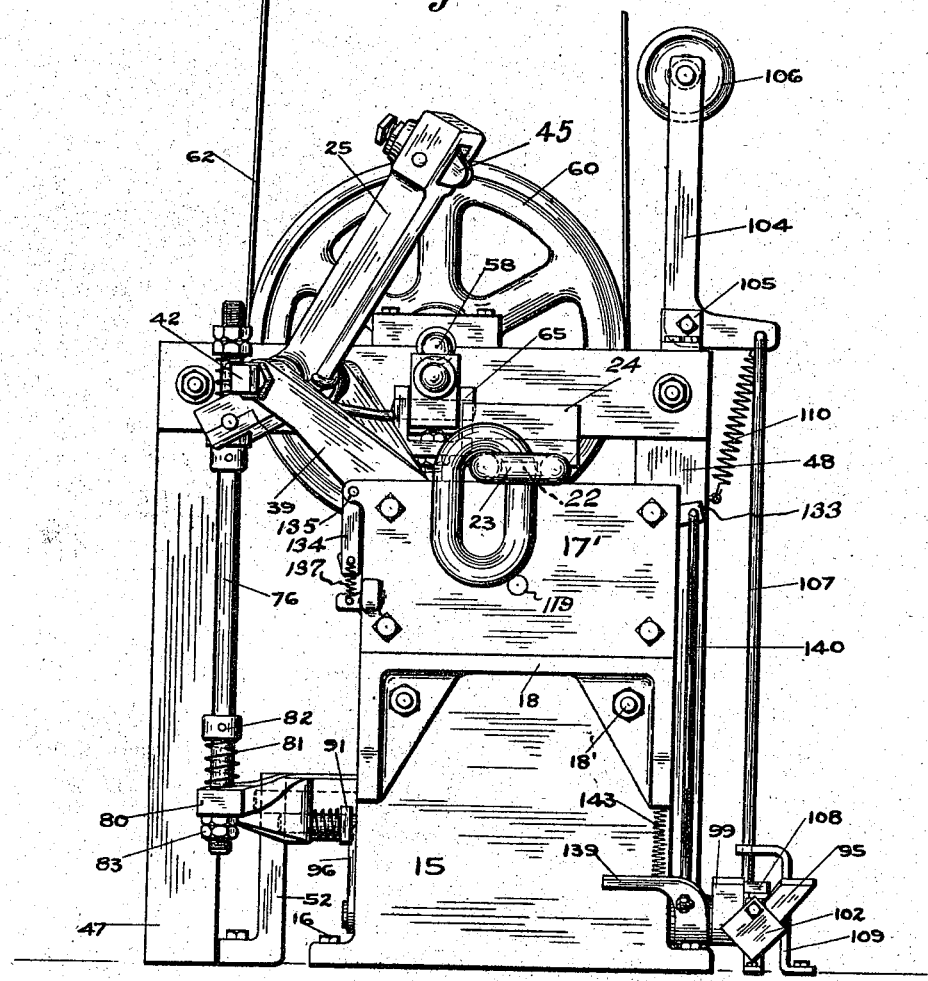

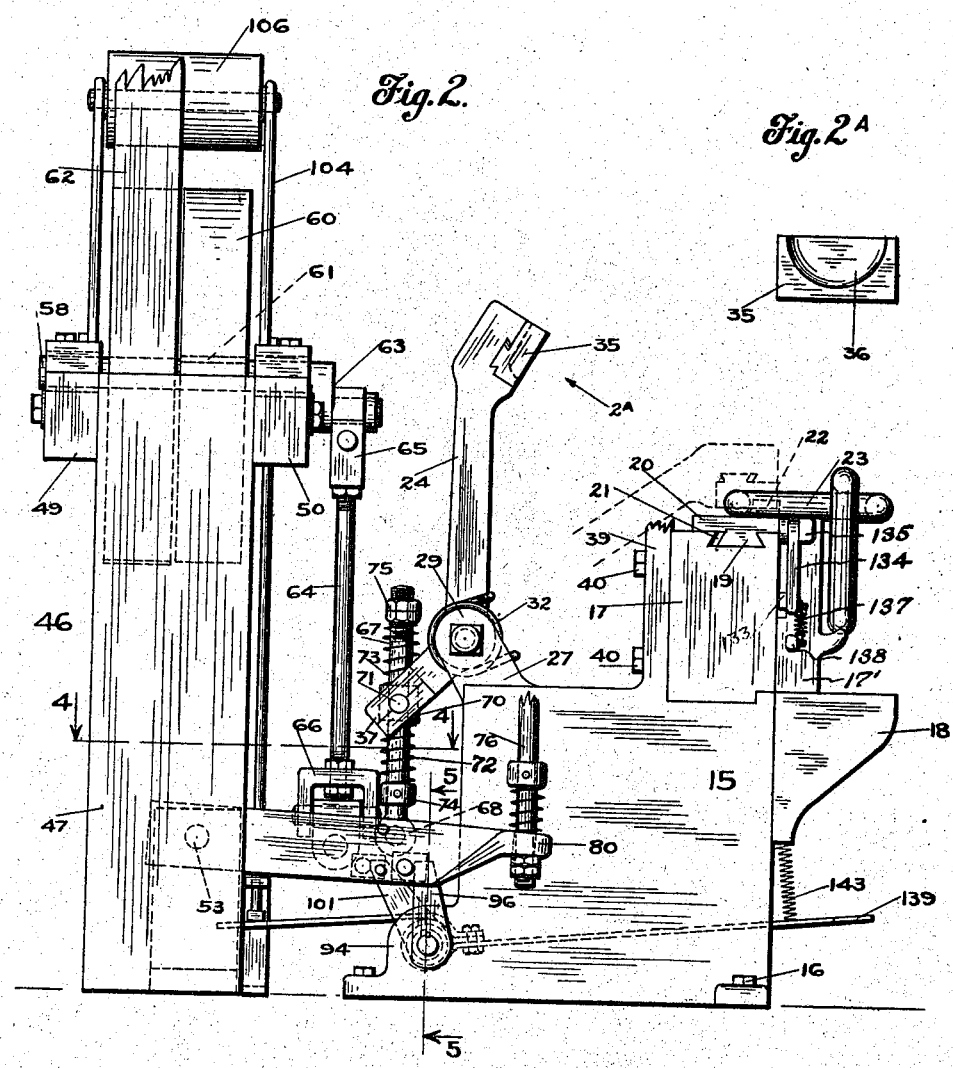

Inventor  
Thomas C. Luce  
By Henry E. Rockwell  
Attorney

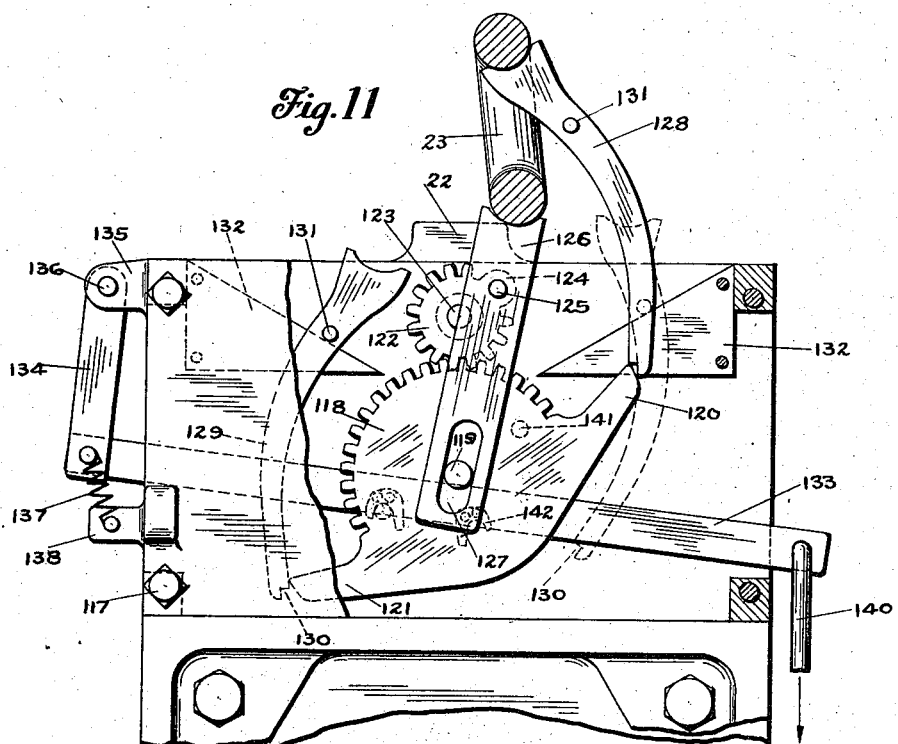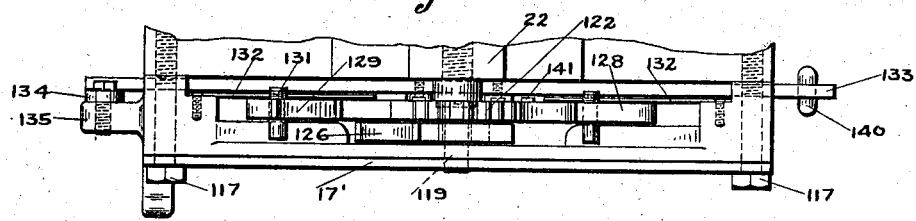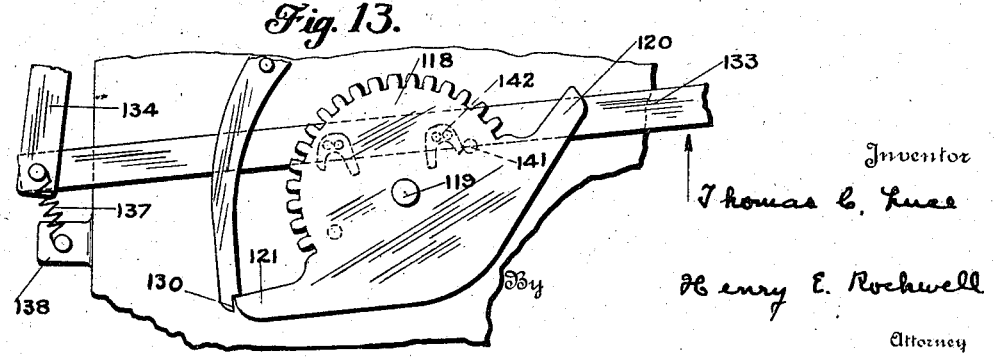

Patented May 22, 1923.

1,456,026

UNITED STATES PATENT OFFICE.

THOMAS C. LUCE, OF STRATFORD, CONNECTICUT.

CHAIN-WELDING MACHINE.

Application filed June 18, 1919. Serial No. 305,170.

*To all whom it may concern:*

Be it known that I, THOMAS C. LUCE, a citizen of the United States, residing in the town of Stratford, county of Fairfield, and State of Connecticut, have invented certain new and useful Improvements in Chain-Welding Machines, of which the following is a full, clear, and exact description.

This invention relates to a welding or forging machine provided with power operated swinging hammers and more particularly to a machine for welding split links in the manufacture of a chain.

Heretofore a large number of welded chains in general use have been manufactured by heating the split links of which the chain is to be constructed in a furnace, after which each link is inserted through the last link of the chain and the overlapping portions of the split link are welded together upon an anvil by pounding upon the link with one or more sledge hammers. This method of closing the links consumes considerable time, requires heavy manual labor and considerable skill on the part of the workmen wielding the hammers. Furthermore if the links are relatively large it is usually necessary to reheat each link one or more times before the weld is completed, thus materially increasing the time consumed in closing up each link.

One important object of my invention therefore is to provide a machine with power operated hammers constructed to quickly and satisfactorily weld the overlapping parts of a link together before the same has cooled sufficiently to make reheating necessary, to thereby entirely eliminate the use of a manually operated hammer in constructing a chain of welded links.

A more specific object of my invention is to provide a link welding machine with at least two hammers, one hammer being provided to perform the major portion of the link closing operation, and a second hammer constructed to smooth down the tip ends of the overlapping portions of the link, to cause them to properly engage the adjacent body portion of the link. The construction and operation of this second hammer is important since the most difficult part of welding a link is to get these tip ends properly welded, and if this is not done the strength of the link is materially reduced.

Another important object of my invention is to provide mechanical means for quickly turning the link over upon its anvil in order that either side of the link may be exposed to the blows of the hammers.

Still another object of my invention is to improve the construction and operation of the type of machine to which my invention relates, and to operate the power driven hammers in such a manner that the jolting and jarring produced by these rapidly moving hammers will be reduced to a minimum.

To these and other ends, the invention consists in the novel features and combinations of parts to be hereinafter described.

In the accompanying drawings:

Fig. 1 is a front elevation of my complete welding machine.

Fig. 2 is a side elevation of the same in which the auxiliary hammer is not shown and the main hammer is shown in full lines in its raised position and in dotted lines in its striking position.

Fig. 2$^A$ is a detail view looking in the direction of the arrow 2$^A$, Fig. 2.

Fig. 3 is a top plan view of Fig. 1.

Figure 4:
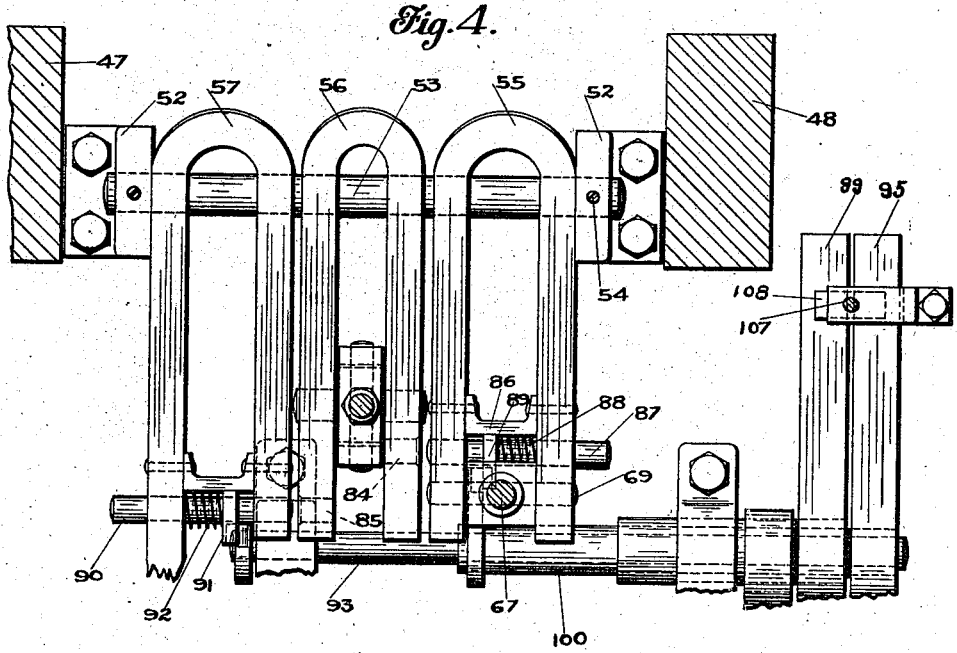

Fig. 4 is an enlarged sectional view taken on the line 4—4 of Fig. 2 looking in the direction of the arrows.

Figure 5:
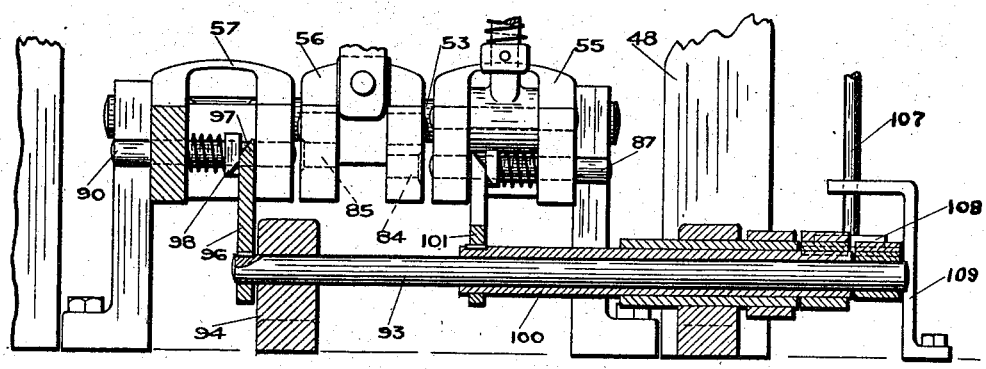

Fig. 5 is a sectional view taken on the line 5—5 of Fig. 2 looking in the direction of the arrows.

Fig. 6 is an enlarged fragmentary view of Fig. 3 looking in the direction of the arrow 6, and showing the auxiliary hammer in full lines in its striking position, and dotted lines in its raised position.

Fig. 7 is a sectional view taken substantially on the line 7—7 of Fig. 3, part of the link being broken away.

Fig. 7$^A$ is a sectional view taken substantially on the line 7$^A$—7$^A$ of Fig. 7.

Fig. 8 is a sectional view taken on the line 8—8 of Fig. 3 looking in the direction of the arrows.

Figure 9:
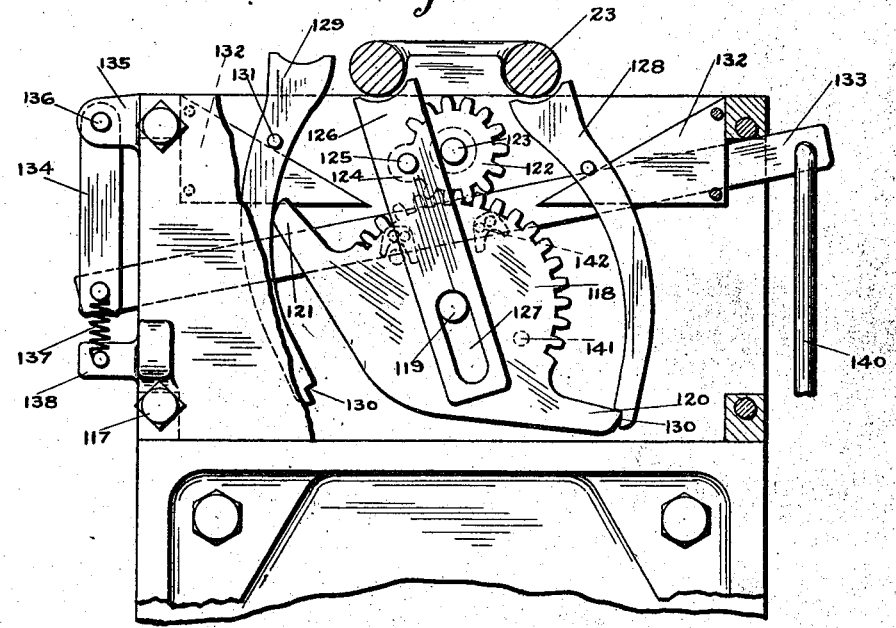

Fig. 9 is an enlarged front view of the anvil, the face plate being removed to disclose my link turning mechanism, and these parts are shown in their inoperative position.

Figure 10:
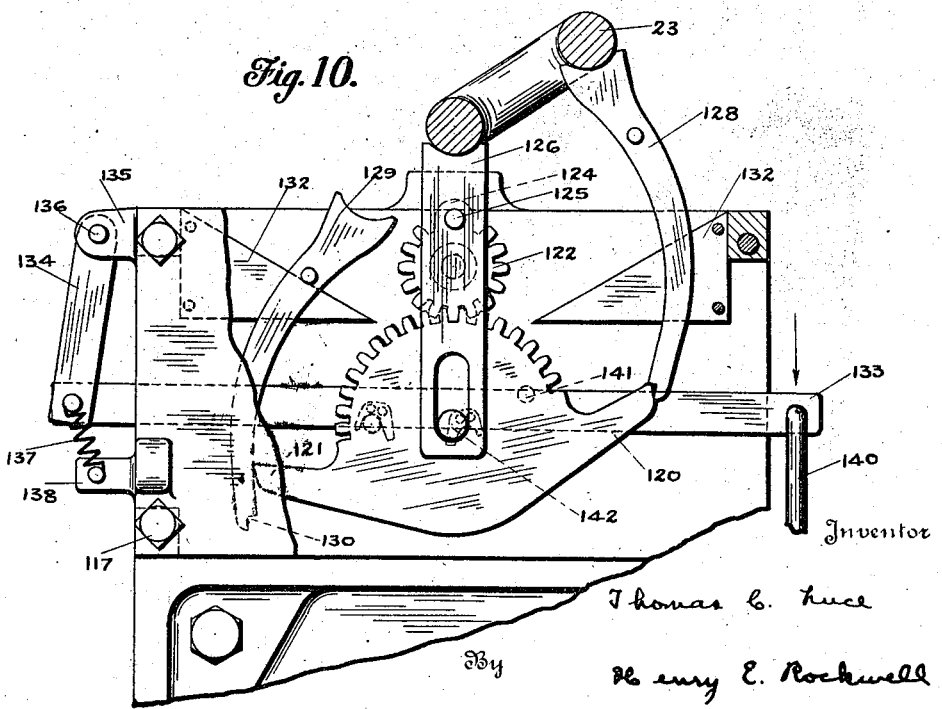

Fig. 10 is a view similar to Fig. 9, showing the position of the link turning mechanism when the link is partly turned.

Fig. 11 is a view similar to Fig. 9, but showing the position of the parts when the turning of the link is nearly completed.

Fig. 12 is a top plan view of the part shown in Fig. 9 with the front plate applied.

Fig. 13 is a fragmentary front view of Fig. 9, showing the position of parts after the turning of the link has been completed; and Fig. 14 is a plan and end view respectively of a split link.

In the embodiment of my invention illustrated in the drawings, I have designated by the numeral 15 an anvil supporting frame, which preferably consists of a relatively heavy box-like casting which may be secured to the floor by bolts 16. Upon the upper face of this frame is mounted the anvil 17. Upon the front face of the frame 15 is preferably secured a shelf 18, the same being secured in place by bolts 18'. The upper face of the anvil 17 preferably has a dove-tailed groove formed longitudinally thereof, which is adapted to receive a correspondingly formed tongue 19, formed upon the lower face of the anvil die 20. The co-operating tongue and groove, just mentioned form a convenient means for rigidly securing the die 20 to the anvil 17, a tapered key 21 preferably being provided, which is wedged in between the tongue and one side of the groove. Upon the upper face of the die 20 is preferably formed an upwardly projecting boss 22, which serves to properly position the link 23 upon the die and give a perfect form to the inside radius of the welded portion.

The anvil supporting frame 15 is preferably provided with two independently operated hammers. One of these hammers, which I prefer to term a main hammer and which I have designated by the numeral 24, is preferably pivotally mounted directly behind the anvil to swing in a vertical plane extending at right angles to the anvil, while the other hammer, which I term the auxiliary hammer and designated by the numeral 25, preferably swings in a plane forming an angle at substantially 45° to the plane of the first mentioned hammer. Upon the upper face of the frame 15 and adjacent the rear edge of the same is preferably formed a pair of spaced upwardly projecting lugs 26 and 27 between which the main hammer 24 is pivotally mounted. The pivotal mounting means, which I have shown, consists in forming threaded drill-holes through the lugs 26 and 27 in which the bolts 28 and 29 are threaded. The inner ends of these bolts are pointed, as indicated by 30, and are received in correspondingly shaped sockets formed in the opposite sides of the hammer 24, these bolts being preferably locked in their proper adjustment by lock nuts 31. In order to provide means for normally supporting the hammer in its raised position, as shown in Fig. 2, and for also counterweighting this hammer, which is of necessity fairly heavy, I have provided the coiled spring 32, a portion of which extends across the front face of the hammer 24, and is then coiled around the oppositely projecting bosses 33 formed upon the hammer, and the ends 34 of this spring engage the forward edge of the bosses 26 and 27, the arrangement of this spring being such that it will be placed under tension as the hammer is swung down towards its anvil, but will be relieved from tension as the hammer assumes its vertical position. Upon the forward end or head of the hammer 24 is preferably mounted the hammer die 35, the striking face of this die being hollowed out, as indicated by 36 to conform to the curvature of the end of the link 23. The hammer 24 is provided with a rearwardly projecting arm 37 by means of which the hammer is operated in a manner hereinafter pointed out. The anvil supporting frame 15 is provided with a second pair of upwardly projecting lugs 38 and 39, the lug 38 being positioned adjacent the lug 27, whereas the lug 39 projects outwardly from the left hand side of the frame 15 and is preferably bolted to the anvil 17 by bolts 40. The auxiliary hammer 25 is pivotally mounted between the lugs 38 and 39 by bolts 41 and 42, similar to the bolts 28 and 29, and this hammer is provided with a coiled spring 43, which operates to normally support its hammer in a raised position similar to the operation of the spring 32, and this hammer 25 is also provided with a rearwardly projecting arm 44, by means of which the same may be operated. The forward end of the auxiliary hammer 25 is provided with a hammer die 45, the construction and operation of which will be hereinafter described.

The power operated means for operating the swinging hammers 24 and 25 will now be described. To the rear of the anvil supporting frame 15 is mounted the frame which I have designated in its entirety by the numeral 46. This frame is preferably separate from the frame 15, and is secured to the floor by any preferred means. The frame 46 consists preferably of the upright end members 47, 48 and the horizontally extending beams 49 and 50, the opposite ends of which are bolted to the upper ends of the uprights 47 and 48 by bolts 51. Upon the floor, but within the frame 46, are mounted the brackets 52, positioned adjacent the inner faces of the uprights 47 and 48, and in these brackets are mounted the opposite ends of the shaft 53, the shaft being non-rotatably secured to the brackets by pins or the like 54. Upon the shaft 53 are mounted three relatively similar U-shaped rocking levers 55, 56 and 57. These levers are mounted to rock about the shaft 53 as an axis, and the middle U-shaped lever 56 is driven by the power means, hereinafter described, while the right and left hand levers 55 and 57 may be operatively connected to the lever 56, and in turn are operatively connected to the hammers 24 and 25 respectively. The means which I have provided for imparting a rocking movement to the lever 56 consists preferably of the following mechanism. Between the spaced beams 49 and 50 is rotatably mounted a shaft 58, upon which are mounted the belt pulleys 59 and 60, the pulley 59 being loosely mounted upon its shaft, while the pulley 60 is rigidly secured to its shaft by a key 61, and either of these pulleys may be driven by the belt 62, which may be shifted from one pulley to the other in a well-known manner, the belt 62 being driven by any preferred source of power. Upon the forward end of the shaft 58 is rigidly secured the crank arm 63, which arm is operatively connected to the rocking lever 56 by the connecting rod 64, a universal joint 65 being provided at the upper end of the connecting rod 64, and a similar universal joint 66 being provided at the lower end of this shaft. From the driving means, just described, it will be seen that when the belt runs over the loose pulley 59, the rocking lever 56 will not be operated, but if this belt is shifted over to run upon the fixed pulley 60, a rocking movement will be imparted to the rocking lever 56.

It will be apparent that means must be provided for operating either of the hammers 24 and 25, and that this means must be constructed so that either hammer may be conveniently brought into and out of operation, as the operator welding the link 23 may desire, but at the same time means must be provided for preventing both hammers from delivering a blow at the same time. The means by which either hammer may be brought into operation, and the means by which the operator may control these hammers will now be described. The operating lever 55 is operatively connected to the main hammer 24 by means of a connecting rod 67, the lower end of this rod being preferably provided with an eye 68, through which a pin 69 passes, the ends of this pin being mounted in the opposite legs of the U-shaped lever 55. The upper end of the connecting rod 67 is connected to the arm 37 by means of a rocking block 70, which block is mounted in a slot formed in the rear end of the arm 37, and is pivotally mounted therein by the oppositely projecting trunnions 71. This block 70 is provided with a drill-hole extending therethrough to slidably receive the connecting rod 67 and in order that the connecting rod may be yieldingly connected to the hammer which it operates, springs 72 and 73 are positioned about this rod below and above the block 70. One end of the spring 72 rests on a collar 74, while its opposite end abuts against the block 70 and one end of the spring 73 engages the block 70 while the opposite end engages the adjustable nuts 75. The rocking lever 57 is operatively connected to the auxiliary hammer 25 by a connecting rod 76, which is rather similar in construction and operation to the rod 64 just described. The upper end of the rod 76 is provided with a spring 77, one end of which abuts against the upper face of the rocking block 78, while the opposite end abuts against the adjustable nuts 79, and a collar secured to the rod 76 operatively engages the lower face of the block 78. The lower end of the rod 76 passes through a drill-hole formed in an extension 80 with which the rocking lever 57 is provided, a spring 81 being provided between the upper face of the extension 80 and a collar 82, and the lower face of the extension 80 is engaged by one of a pair of lock nuts 83 mounted upon the lower end of this rod. The resilient connection between the rocking levers and their hammers is very desirable, because the entire welding machine is in this manner relieved to a large extent from the severe jolting and jarring to which it would be submitted if no play should be permitted between the hammers which are required to deliver hard and fast blows to the work upon the anvil and the rotating pulley wheel which supplies the power to these hammers.

The means which I have provided for operatively connecting either the rocking lever 55 or the rocking lever 57 to the power operated lever 56 will now be described. One of the arms of the U-shaped rocking lever 56 has a drill-hole 84 formed therethrough and the opposite arm has a similar drill-hole 85 formed therethrough. The arms of the U-shaped lever 55 are preferably retained in their spaced relations by a block 86 which may be riveted between the same, and in front of this block is mounted a sliding bolt 87, the opposite ends of which are slidably mounted in drill-holes formed through the arms of this U-shaped lever and the inner end of this bolt 87 is positioned to be moved into and out of the drill-hole 84, a spring 88 being provided to force the bolt 87 into the drill-hole 84. The bolt 87 has a substantially rectangular block 89 rigidly secured to an intermediate portion thereof and one end of the spring 88 abuts against this block, while the opposite end abuts against an arm of the U-shaped member 55. The rear face of the block 89 slidably engages the forward face of the block 86 to thereby prevent the block 89, and the bolt to which it is secured from rotating.

The rocking lever 57 is provided with a sliding bolt 90, which operates in exactly the same manner as the sliding bolt 87, just described. This bolt 90 is provided with a rectangular block 91 against which one end of the coiled spring 92 abuts to force the bolt 90 into the drill-hole 85. The arrangement of the sliding bolts 87 and 90 is such that whenever they are released these bolts will be forced into operative engagement with the sockets formed in the lever 56 as soon as the socket is brought into alignment with these bolts. In order to provide means controlled by the operator for retaining the bolts 87 and 90 in their retracted position and thereby prevent the hammers from being driven, I have provided the relatively long rocking shaft 93, one end of which is rotatably mounted in a bearing block 94 and to the opposite end of this shaft is rigidly connected a foot-controlled treadle 95, which treadle is normally held in its raised position by means hereinafter described. Upon the inner end of the shaft 93 is rigidly secured a rocking plate 96, the upper end of which is tapered, as at 97, to cooperate with a correspondingly tapered surface 98, formed upon the block 91, the arrangement being such that when the foot of the operator is removed from the treadle 95, it moves upwardly to its normal position, thereby rocking the shaft 93, which in turn moves the plate 96, so that its upper end will lie in a position to be engaged by the block 91, as the lever 57 is rocked downwardly and as this occurs, the inclined surfaces 97 and 98 cooperate to retract the bolt 90, since the upper end of the plate will in this manner be inserted between one face of the lever 57 and the block 91, as shown in Fig. 5. As soon as this occurs, the lever 57 is no longer connected to the operating lever 56 and the lever 57 will remain in its depressed position until the treadle 95 is again depressed to swing the plate 96 out of engagement with the block 91 to permit the bolt to be moved into locking engagement with the lever 56. In order to control the driving connection between the levers 55 and 56, a second foot treadle 99 is provided, which is rigidly secured to a relatively long sleeve 100 loosely mounted upon the shaft 93, and upon the inner end of this sleeve is mounted a plate 101, the upper end of which cooperates with the block 89 to retract the bolt 87 in the manner just described. From the construction just described, it will be seen that assuming the driving belt is running on the fixed pulley 60, the main hammer 24 will be operated as long as the treadle 99 is held in its depressed position, and the auxiliary hammer 25 will be operated as long as the treadle 95 is held in its depressed position. In order to prevent the treadles 95 and 99 from being depressed simultaneously, and thereby prevent both hammers from being operated simultaneously, I have provided the swinging stop 102 (see particularly Figs. 1 and 8), this stop is pivotally mounted upon a supporting bracket 103 positioned between the adjacent treadles 95 and 99, the arrangement being such that when one treadle is depressed, for example, the treadle 99, as shown in full lines in Fig. 8, the stop 102 will be swung to the position shown in full lines in this figure to thereby prevent the depression of the treadle 95, and if the treadle 95 is depressed, the stop 102 will be swung in the opposite direction to prevent the depression of the treadle 99.

In order that the operator may do good work upon the welding machine herein described, it will be apparent that means must be provided for enabling him to vary the force of the blows delivered by the hammers, and in order that this may be accomplished, I have provided the means which I will now describe. The driving belt 62 is normally rather loose so that considerable slippage between this belt and the fast pulley 60 is permitted, so that when the operating lever 56 is operatively connected to either the rocking lever 55 or 57, the hammer operated thereby will strike the work upon the anvil a relatively light blow, and in order to increase the force of the blow delivered by these hammers, it is necessary to tighten the belt 62. For this purpose I have provided a belt tightener controlled by the operator. The belt tightener illustrated consists of a rocking frame 104, which is pivotally mounted upon a supporting shaft 105. This frame is provided with a pair of upwardly directed arms, between which a belt tightening roller 106 is rotatably mounted, and the lower portion of this frame is provided with a pair of outwardly projecting arms, one of which has an operating rod 107 connected thereto, and upon the lower end of this rod is formed a cross-head 108, which cross-head is positioned to be engaged by the rearwardly projecting ends of the treadles 95 and 99, the arrangement being such that when either of these treadles is depressed, the rod 107 will be raised, which in turn moves the belt tightening roller into engagement with the driving belt, so that this belt may be tightened as much as desired by increasing the pressure upon the outer end of either of the treadles 95 and 99. A bracket 109, which is secured to the floor, is provided to slidably retain the lower end of the rod 107 in its proper position relatively to the operating levers 95 and 99, and a spring 110 is provided to normally hold the roller 106 out of operative engagement with the belt 62, this spring serves also to support the forward end of the levers 95 and 99 in their raised position by exerting pressure on the rear ends of these levers.

In welding the overlapping parts of a split link together, for example, such as shown in Fig. 14, considerable care and skill is required to get the tip end of the overlapping parts properly welded to the body portion of the link, and if this is not done, the strength of the link will be materially reduced and a defective link will be produced. In order to properly weld these tip ends to the portion of the link which they overlap, I have provided the type of hammer die 45 mounted upon the auxiliary hammer 25, which I shall now describe in detail. The head of the hammer 25 has a socket 111 formed therein, in which is pivotally mounted the hammer die 45 by means of a pivot pin 112. The die 45 is permitted a limited amount of rocking movement within the hammer head and is normally retained in the position shown in Fig. 7 by a spring 113 mounted in a drill-hole formed in the head of the hammer and retained therein by an adjustable bolt 114, the lower end of this spring being positioned upon the upper face of the rocking die 45. The downward rocking movement of this die is limited by a lug 115 projecting outwardly therefrom and positioned to abut against a shoulder 116 formed upon the hammer, the arrangement being such that when this auxiliary hammer strikes the work upon the anvil, the die 45 will be rocked slightly about its pivot pin 112, thereby sliding the face of the die 45 over the work at the instant it strikes the same. This movement tends to knead or smooth the tip end of the link down into proper engagement with the body portion of the link. This particular operation of the die 45, by means of which the metal is worked in a direction at right angles to the direction of impact, causes these tip ends to unite with the body portion of the link in a very satisfactory manner. In order that the striking face of the die 45 will properly conform to the curvature of the link, this face is preferably given a concaved curvature in cross-section, as shown in Fig. 7A, while at the same time it is given a convexed curvature in a longitudinal direction, as shown in Fig. 7.

In welding a link, it is necessary to turn the same over from time to time, so that first one side of the link and then the other will be exposed to the hammer, and in order that this link may be quickly and accurately turned over so that as little time as possible may be lost in turning the same, I have provided the link turning mechanism shown in Figs. 9 to 13 inclusive. This mechanism is mounted upon the front face of the anvil 17, and is preferably housed between the front face of the anvil and a plate 17' secured thereto by means of bolts 117. Upon the front face of the anvil is mounted a rocking gear 118 mounted to rock back and forth upon the stud shaft 119. This gear is provided with the oppositely extending fingers 120 and 121. The teeth of the gear 118 cooperate with a pinion 122, which is rotatably mounted upon the stud shaft 123, this pinion being provided with a lug or projection 124 having a pin 125 projecting laterally therefrom. The pin 125 has a relatively long plate 126 pivotally secured thereto and operated thereby. The upper end of this plate is notched to conform to the curvature of the link and engages the same to assist in turning this link, and the lower portion of this plate has a relatively long slot 127 formed therein in which the stud 119 is slidably received. Upon the opposite sides of the gears 118 and 122 are mounted the slides 128 and 129, which are similar in construction and operation. The upper end of these slides are cut away, as shown, to conform to the curvature of the link they assist in turning and the lower end of these slides are notched, as at 130, these notches 130 being adapted to be engaged by the tip end of the fingers 120 and 121 in the manner hereinafter pointed out. The slides 128 and 129 are further provided with the pins 131 extending through the same and projecting from the opposite faces thereof, which pins are adapted to cooperate with the upper inclined face of the triangular blocks 132. These slides are not fastened to any mechanism within my link turning device, but operate in the relatively narrow slot between the front face of the anvil and the cover plate 17' secured to the same. These slides, when released, move downwardly by the force of gravity to the inoperative position occupied by the slide 129 in Fig. 11, the pins 131 cooperating with the inclined face of the plate 132 to move the upper end of these slides towards the operating gears. The gear 118 does not turn through a complete circle, but is rocked back and forth by the rocking lever 133, one end of which is pivotally secured to a second lever 134 having its upper end pivotally secured to the lugs 135 by a pivot pin 136, and this lever 134 is normally retained in its vertical position by a coiled spring 137, one end of which is connected to the lower end of this lever, and the other to a fixed lug 138. The rocking lever 133 is operated by means of the foot treadle 139, which treadle preferably rocks about the same axis, as levers 95 and 99, above described, and the right hand end of the lever 133 is operatively connected to the treadle 139 by a connecting rod 140. In order that the gear 118 will be rocked in one direction when the operating lever 133 is depressed, and will be rocked in the opposite direction the next time this lever is depressed, I have provided the gear 118 with pins 141 projecting from a lateral face thereof. These pins are positioned to cooperate with notched blocks 142 rigidly secured to the lateral face of the lever 133, and these blocks are so positioned upon their lever that each time the lever is raised, the notch of one of these blocks will be brought into operative engagement with the pin 141 which is at that instant elevated, as clearly shown in Fig. 9. It should be noted that the distance between the blocks 142 is less than the distance between the pins 141. This is necessary in order that when one pin is engaged by its cooperating block, the other pin will clear the second block when the lever is depressed, and in order that this may occur, the operating lever 133 is mounted so that it may move bodily in a longitudinal direction sufficiently to bring either one block 142 or the other into operative engagement with one of the pins 141. This longitudinal movement is permitted by the rocking lever 134 and spring 137. The position of the blocks 142 upon the operating lever 133 is such that when this lever is raised towards the upper limit of its stroke, one edge of one of the blocks 142 will abut against one of the pins 141, as shown in Fig. 13, and as the upward movement of this lever is continued, this block will be moved above the pin sufficiently to permit the lever to be moved by the spring 137 to bring the notch of the block directly over the pin, whereupon when the lever is again depressed, the gear will be rocked in a direction opposite to that in which it rocked upon the immediate preceding depression of the lever. When the operating lever 133 has been moved to the upper limit of its stroke, one of the blocks 142 will be brought into operative engagement with one of the pins 141 in the manner just pointed out, while at the same time one of the fingers 120, 121, will engage the notch 130 formed at the lower end of one of the slides 128 or 129, whereupon when the treadle 133 is depressed, the slide, the lower end of which is at that instant engaged by one of the fingers, is brought into engagement with one side of the link 23 to be turned, and as the rocking movement of the gear 118 is continued, this slide will be elevated to the succesive positions shown in Figs. 9, 10 and 11, while at the same time the plate 126 will have been brought into operative engagement with the opposite side of the link and will have raised the same sufficiently to clear the boss 22. When the turning operation of the link has advanced to the position shown in Fig. 11, the workman or operator may easily complete this turning movement by giving a slight twist to the link with the tongs by which he holds the link throughout the entire welding operation. When the rocking of the gear 118 is continued in an anti-clockwise direction slightly beyond the position shown in Fig. 11, the notch 130 at the lower end of the slide 128 will be released from the finger 120, whereupon it will drop, due to the force of gravity to the dotted position indicated in this figure, while at the same time, the further rotation of the gear 118 will have caused the plate 126 to be moved by its pinion to an inoperative position below the upper face of the die and to the right hand side of the stud 123. When this has occurred, the opposite finger 121 will then lie below the notch 130 formed at the lower end of the slide 129, and if the treadle 139 is then released, it will be returned to its normal raised position by the coiled spring 143 without moving the gear 118, whereupon all the elements of the link turning mechanism will be in a position to turn the link in the opposite direction as soon as the treadle 139 is again depressed.

The operation of my device is as follows:

Assuming that the open links of which the chain is to be manufactured have been heated to a welding heat, the blacksmith or operator grasps a link in a pair of tongs and inserts one of the legs of the open link through the last link of the chain being manufactured, this open link while still held by the tongs is placed upon the anvil die 20 with the overlapping portions of the link engaging the boss 22, as shown in Figs. 1, 2, 6 and 7. The operator then steps on either the treadle 95 or 99 to bring either the main or auxiliary hammer into operation, as either hammer may be used first, but it is usually preferable to use the main hammer to close the link and the auxiliary hammer later to complete the welding of the tip ends of the overlapping portion of the link. While either hammer is being used, the force of the blows delivered by the same may be varied by increasing the pressure upon the operating treadle controlling the same, since both the treadles 95 and 99 operate to swing the belt tightening roller 106 into operative engagement with the belt 62. After a few blows have been delivered by either hammer to one side of the link, the link is then turned over to receive blows upon the opposite side of the same, and this is done by stepping on the lever 139. The depression of the foot treadle 139 operates the rocking gear 118, which in turn raises either one or the other of the link engaging slides 128, 129 to bring one of these slides into operative engagement with one side of the link to be turned, while at the same time the upper end of the plate 126 is brought into operative engagement with the opposite side of the link, whereupon the link is raised sufficiently to clear the boss 22, and is turned almost completely over, the turning of the link being completed by the operator who gives a slight final twist to the same through his tongs to thereby bring the opposite side of the link into engagement with the positioning boss 22. In this manner, the welding of very large links may be completed so quickly that it will be unnecessary to reheat the same in order to complete the weld, it being understood that the machine herein disclosed is adapted to deliver blows very much harder and faster than can possibly be delivered by an operator or blacksmith swinging a sledge hammer.

Although the various features of my invention are disclosed and described in connection with a link welding machine, it will be apparent that they are not necessarily limited in their use to this type of machine, but may readily be applied to various types of welding or forging machines.

In the drawings I have disclosed the levers 95 and 99 as adapted to be controlled by the foot, but it will be apparent that these levers may readily be controlled by hand if desired. I have, therefore, designated these levers in some of the claims as manually controlled.

What I claim is:

1. In a chain welding machine, an anvil, two vertically swinging hammers mounted to deliver blows upon the same face of work on said anvil, and means to selectively operate either of said hammers.

2. In a chain welding machine, an anvil, two vertically swinging hammers mounted to deliver blows upon the upper face of said anvil, means to selectively operate either of said hammers, and means to prevent the simultaneous operation of said hammers.

3. In a welding machine, an anvil, a pair of independently operated swinging hammers mounted to impart blows upon the same surface of the work upon said anvil, and power driven means for operating either of said hammers.

4. In a welding machine, an anvil, a vertically swinging hammer mounted to impart blows to work upon said anvil, a hammer die carried by said hammer, said die constructed to simultaneously strike and slide over the work upon the anvil, and power driven means for operating said hammer.

5. In combination with an anvil, a swinging hammer positioned to impart blows to work upon said anvil, a movable die carried by said hammer whereby the work is slidingly struck by said die, and power driven means for operating said hammer.

6. In combination with an anvil, a hammer mounted to impart blows to work upon said anvil, a movable die carried by said hammer whereby the blows of said hammer are converted into a sliding impact, and means for operating said hammer.

7. In combination with an anvil, a swinging hammer, means for operating said hammer, and a die pivotally mounted upon said hammer whereby work upon said anvil receives a sliding impact thereon from the blow of said swinging hammer.

8. A chain welding machine comprising, an anvil, two vertically swinging hammers, a source of power, said hammers mounted to deliver blows upon the upper face of said anvil at substantially the same point and means to selectively connect either of said hammers to said source of power, said means also operating to vary the degree of power supplied.

9. In a welding machine, an anvil, a swinging hammer mounted to impart blows to work upon said anvil, power driven mechanism for operating said hammer, means for engaging and disengaging said hammer from said power means, manually controlled means for varying the force of blows delivered by said hammer, and a single lever for controlling both of said means.

10. In a welding machine, an anvil, a pair of hammers, a power driven rocking lever, and manually controlled means to selectively connect either of said hammers to said rocking lever.

11. In a welding machine, a pair of vertically swinging hammers and means to selectively operate either of said hammers independently, said hammers mounted to deliver blows at substantially the same point upon the same surface of the work.

12. In a welding machine, an anvil, a swinging hammer mounted to cooperate with said anvil, a power operated lever, means for operatively connecting said swinging hammer to said lever, and manually controlled means for engaging and disengaging the connection between said hammer and lever.

13. In a welding machine, a power operated rocking lever, a swinging hammer, means for operatively connecting said hammer to said lever, and manually controlled means for either connecting said first mentioned means to said rocking lever or for releasing the same therefrom.

14. In a welding machine, a power operated rocking lever, a swinging hammer, means for operatively connecting said hammer to said lever, a sliding bolt for operatively securing said means to said lever and for releasing the same therefrom, and manually controlled means for operating said bolt.

15. In a welding machine, an anvil, a swinging hammer mounted to cooperate therewith, a power operated rocking lever, means for operatively connecting said hammer to said lever, and a pedal controlled means for engaging and releasing said means from said rocking lever.

16. In a welding machine, an anvil, a pair of swinging hammers mounted to cooperate with said anvil, a power operated rocking lever, manually controlled means for operatively connecting either of said hammers to said rocking lever, and means for preventing said hammers from delivering their blows simultaneously.

17. In a welding machine, an anvil, a swinging hammer cooperating therewith, power operated means for operating said hammer, and a spring operated lever movable in one direction to connect said hammer to said power means and movable in the opposite direction to disengage said hammer from said power means.

18. In a welding machine, an anvil, a swinging hammer cooperating therewith, power operated means for operating said hammer, a spring operated lever movable in one direction to connect said hammer to said power means and movable in the opposite direction to disengage said hammer from said power means, and second means controlled by said spring operated lever for varying the force of the blows delivered by said hammer.

19. In combination with a pair of swinging levers, a stop swingingly mounted between said levers and constructed to be moved by the operation of one lever into the path of movement of the other lever to thereby prevent the operation of both levers simultaneously.

20. In combination with a link welding machine, an anvil or the like, and manually operated means for turning a link over upon said anvil without withdrawing said link from said anvil.

21. In combination with a link supporting element, manually operated means for turning said link over upon said element without altering the relative positions of said element and said link.

22. In combination with a link welding machine, an anvil, two power operated hammers, and manually operated means for turning a link over upon said anvil to thereby expose either face of the link to said hammers, said means being located closely adjacent said anvil and immovable therefrom.

23. In a machine for making chain or the like, a power operated hammer, an anvil, means to turn the work over upon said anvil, and a vertically swinging lever to operate said means.

24. In a machine of the class described, a power operated hammer, an anvil, means adapted to engage and turn over the work upon said anvil, a swinging lever to operate said turning means and a manually operable member connected to said swinging lever.

25. In a link welding machine, an anvil, a hammer cooperating therewith, and foot operated means for turning a link upon said anvil alternatively in first one direction and then the other without withdrawing said link from over said anvil.

26. In a link welding machine, an anvil, a hammer cooperating therewith, and treadle operated means for turning a link upon said anvil alternatively in one direction or the other without altering the relative longitudinal position of said link in respect to said anvil.

27. In a link machine, a rocking gear, a reciprocating lever, means upon said lever cooperating with said gear to rock said gear in a different direction upon each successive depression of said lever, a link support, and means actuated from said rocking gear to turn a link on said support.

28. In a link machine, a rocking gear, a reciprocating lever, means upon said lever cooperating with said gear to reverse the direction of movement of said gear each time said lever is depressed, a link support, and means actuated by said rocking gear to turn a link on said support without withdrawing said link from said anvil.

29. In a link machine, a rocking gear, a rocking lever, means for rocking said lever in first one direction and then the other, a pair of symmetrically arranged link engaging slides, and means carried by said rocking gear to operate one of said slides when said gear is moved in one direction and to operate the other slide when said gear is moved in the opposite direction to turn a link over a link support.

30. In combination with a die provided with a link positioning boss, link turning means including a rocking gear, a blade operated thereby for lifting one side of said link out of engagement with said boss, and a slide constructed to engage the opposite side of said link and operated by said gear to impart a turning movement to said link.

31. In a link turning device, a rocking gear, means for rocking said gear in first one direction and then the other, a pair of link engaging slides positioned upon the opposite sides of said gear, and means upon said gear for operating but one slide when rocked in one direction and for operating the other slide when rocked in the opposite direction.

32. In a link turning device, a rocking gear, means for rocking said gear in first one direction and then the other, a pair of link engaging slides positioned upon the opposite sides of said gear and operated thereby, a blade constructed to engage the link to be turned, and means operated by said gear for moving said blade in the opposite direction to that in which said gear is rocked.

33. In a link turning device, a reciprocating lever, a rocking gear, means for operating said gear by said lever to rock said gear in a different direction upon each successive depression of said lever, and link engaging slides operated by said rocking lever.

34. In a link machine, a reciprocating lever, a rocking gear, and means for operating said gear by said lever to rock said gear in a different direction upon each successive depression of said lever, comprising projections upon said gear, projection engaging elements upon said lever, and means for moving said lever bodily to bring the engaging elements carried thereby into operative engagement with said projections, a link support, and means actuated by said rocking gear to turn a link on said support.

35. In a link machine, a reciprocating lever, a rocking gear, and means for operating said gear by said lever to rock said gear in a different direction upon each successive depression of said lever, comprising cooperating elements carried by said gear and lever respectively, said elements constructed and arranged to operate said gear only upon the depression of said lever, whereby said lever may be raised without operating said gear, a link support, and means operated by said rocking gear to turn a link on said support.

36. In a device such as described, a movable metal working member, and means for operating the same comprising a pair of separate rocking levers, means for operating one of said levers, a sliding bolt for operatively securing the other lever to said operated lever, manually operable means movable into position to be engaged by said bolt as the lever carrying said bolt approaches the end of its rocking stroke, to thereby retract said bolt to its inoperative position, and means for connecting said operated lever with said metal working member.

37. In a device such as described, a movable metal working member, and means for operating the same comprising a pair of independently movable rocking levers, means for rocking one of said levers, a sliding bolt for operatively securing the other lever to said first mentioned lever, a spring for protracting said bolt to operatively connect said levers together, manually operable means movable into position to be engaged by said bolt to thereby retract said bolt to its inoperative position, said last mentioned means positioned to be engaged by said bolt as the lever carrying the same approaches the end of the stroke, and means for connecting said operated lever with said metal working member.

38. In a device such as described, a movable metal working member, and means to operate same comprising a pair of independently movable rocking levers, a sliding bolt carried by one of said levers, a spring for protracting said bolt into operative engagement with the other lever to connect said levers together, means positioned to be engaged by said bolt to retract the bolt as the lever carrying the same approaches the end of its stroke, manually operable means for holding said last mentioned means in an inoperative position, and means for connecting said metal working member with the first mentioned lever.

39. A power hammer carrying a die movable relatively thereto.

40. A swinging power hammer, and a die pivoted to said hammer for movement relatively thereto.

41. A swinging hammer, a die pivoted to said hammer, and means for yieldingly retaining said die in a normal position.

42. In combination with an anvil, two hammers mounted to deliver blows upon the same face of the work on the anvil, a source of power for operating said hammers, and means for selectively connecting either of said hammers to said source of power.

43. In combination with an anvil, two hammers mounted to deliver blows upon the same face of the work on the anvil, a source of power for operating said hammers, means for selectively connecting either of said hammers to said source of power, and means for preventing the simultaneous operation of said hammers.

44. In a metal working machine, a source of power, two swinging hammers, means to independently connect either of said hammers to said source of power and means acting in cooperation with said connecting means to increase the effective blows of said hammer.

45. A metal working machine consisting of a source of power, a rocking lever operated by said power, a swinging hammer, a rocking lever connected to said hammer, means to connect the second mentioned rocking lever to the first mentioned rocking lever to give power to the hammer and means to vary the effective blow of said hammer.

46. In a metal working machine, a power driven rocking lever, two hammers, two rocking levers connected to said hammers respectively and means to selectively connect either of said hammer connected levers to the power driven lever.

47. In combination with a work support, two hammers mounted to deliver blows upon the same face of the work on said support, a source of power for operating said hammers, means for selectively connecting either of said hammers to the source of power, means for preventing the simultaneous operation of said hammers and means to vary the effective force of said power the two last mentioned means operated by the first mentioned means.

48. In combination with a work support, two hammers mounted to deliver blows upon work on said support, a source of power for operating said hammers, means for independently connecting either of said hammers to the source of power, means to prevent the other hammer from being so connected when one is connected, means in cooperation with the connecting means to vary the effective blow of said hammer, and means operating upon the work independent of said hammers to cause different faces of said work to be presented to the hammers.

49. A metal working machine comprising, a frame, a rock shaft mounted in said frame, a power driven rocking lever mounted upon said rock shaft, a pair of swinging hammers, a pair of rocking levers connected to said hammers and mounted upon said rock shaft, means to connect and disconnect the hammer rocking levers with the power driven rocking lever selectively, means to prevent both hammer rocking levers from being so connected simultaneously, a work support, means for turning work upon said support to present the different faces of said work to the hammers and means to vary the force of the blows of said hammers.

50. In a metal working machine, a work support, a source of power, a member adapted to be continuously operated by connection with the source of power, two swinging hammers mounted to deliver blows upon the same face of the work upon said work support and means to selectively connect the hammers to said member.

51. In combination with an anvil, two hammers mounted to deliver blows upon work on the anvil, a source of power for operating said hammers, separate means for selectively connecting either of said hammers to said source of power, and means acted upon by one of the connecting means to prevent the operation of the other connecting means whereby one hammer cannot be operated while the other is in operation.

52. In a metal working machine, a source of power, two swinging hammers, two operating levers for connecting said hammers to said source of power selectively, and means operated by one of said levers to prevent the operation of the other lever.

53. In a welding machine, an anvil, a pair of swinging hammers mounted to cooperate with the upper face of said anvil, and means to selectively operate either of said hammers.

In witness whereof, I have hereunto set my hand on the 16th day of June, 1919.

THOMAS C. LUCE.